Figure 1:
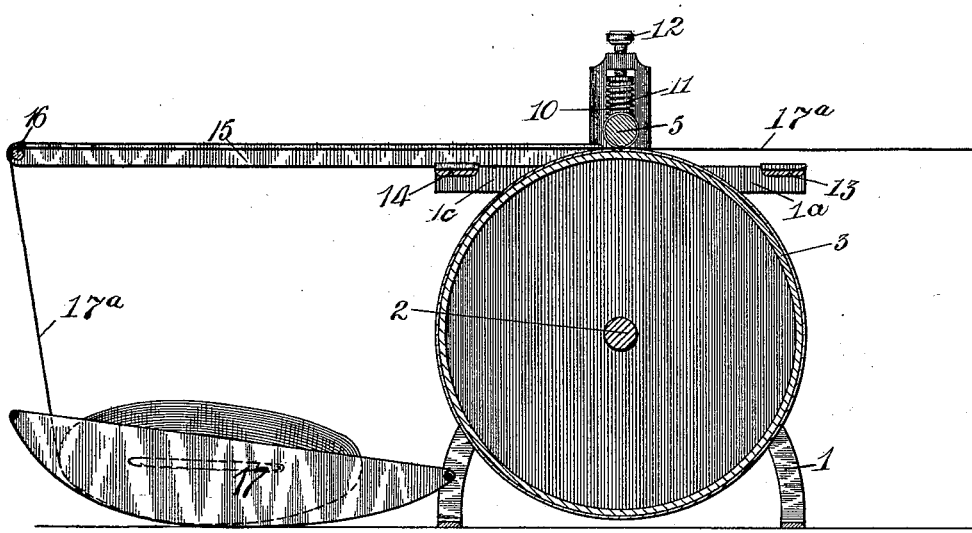

(No Model.) 2 Sheets—Sheet 1.

J. H. VANDERBURGH.
CLOTH MEASURING MACHINE.

No. 520,463. Patented May 29, 1894.

Witnesses,
C. L. Laurie
M. E. Angell

Inventor,
J. H. Vanderburgh
by C. H. Rickes
his atty

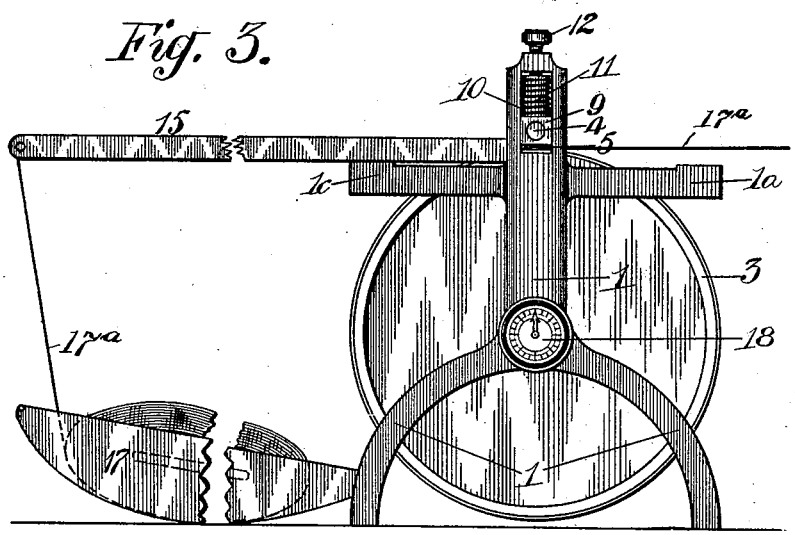
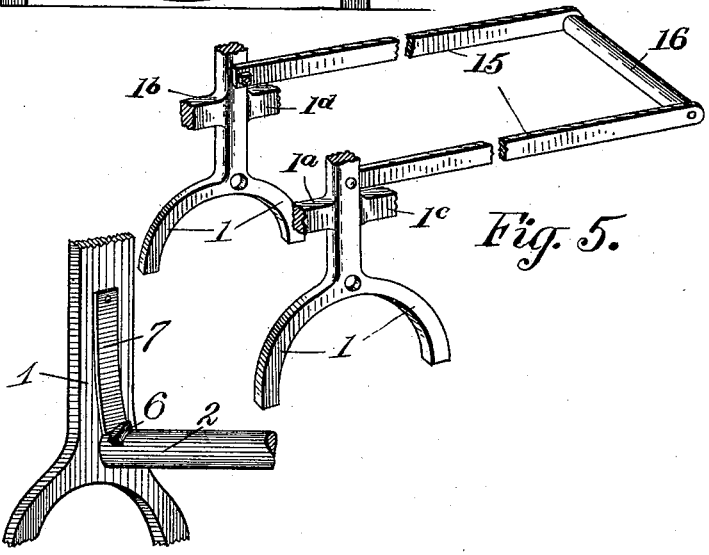

United States Patent Office.

J. HARVEY VANDERBURGH, OF ORONO, CANADA.

CLOTH-MEASURING MACHINE.

SPECIFICATION forming part of Letters Patent No. 520,463, dated May 29, 1894.

Application filed November 18, 1892. Serial No. 452,456. (No model.)

*To all whom it may concern:*

Be it known that I, J. HARVEY VANDERBURGH, school-teacher, of the village of Orono, in the county of Durham and Province of Ontario, Canada, have invented certain new and useful Improvements in Cloth-Measuring Machines; and I hereby declare the following to be a full, clear, and exact description of the same.

This invention relates to a machine for blocking and measuring cloth; and the object of the invention is to construct a machine in which simplicity, accuracy, and rapidity are combined and which will do the work much better than could be done by hand so that time, labor, material, and brain-work will be saved and mistakes or errors on the part of the salesmen will be prevented; and the invention consists essentially of a suitable frame in which are journaled the ends of a measuring roll, the periphery of which is covered with felt or like material and the circumference of which measures exactly thirty-six inches so that one revolution of the measuring roll will represent one yard of material; a pressure roll located above and contiguous to the measuring roll and covered with material similar to the covering of the measuring roll, the function of this pressure roll is to keep the goods on the measuring roll so that the passage of the goods between the measuring roll and the pressure roll will cause the revolution of the measuring roll which will accurately measure the amount of goods that have passed over it; the function of the pressure roll is also to prevent the goods being measured from slipping in any manner over the measuring roll and passing away from the measuring roll unmeasured; a ratchet tooth secured to the spindle of the measuring roll, a dog secured to the frame work, said ratchet tooth adapted to strike said dog after each revolution of the measuring roll and cause a click or other sound to enable the salesmen to keep count by sound of the number of yards of material measured off, this ratchet tooth can only pass the dog during the forward revolution of the measuring roll and the reverse revolution of the measuring roll will be instantaneously arrested by the ratchet tooth coming in contact with the dog; this construction also permits of the measuring roll commencing its revolution each time from the same starting point; located above the measuring roll and to its front side is a tension bar which in practice assists in straightening and taking out of the goods any creases, and which also keeps the goods away from the measuring roll and enables the salesmen to readily handle the goods; it also serves when required as a tension to block the goods; located above and at the rear side of the measuring roll is a second tension bar which straightens the goods out before allowing them to pass over the measuring roll and which also serves as a means for preventing the web following the measuring roll during its revolution, and in the event of the web attempting to follow the revolution of the measuring roll it will cause the web to drop back into a pan located to the rear of and below the measuring roll which is constructed especially for the purpose of receiving and retaining the web; to also provide a supplemental frame to be attached to the machine when it is required to measure or block double fold goods and this consists of two side bars detachably connected to the frame of the machine and connected together at their outer ends by a cross bar over which the goods pass from the web in the pan to the measuring roll, and which cross bar is sufficiently removed from the measuring roll to cause the goods to return to the pan without coming in contact with the measuring roll; this supplemental frame is particularly required when double width goods are being measured in stock taking as the web is reversed in order to be wound in the proper manner on the second board; and the tendency of the goods in such a case is to drag the web up with them during their passage to the measuring roll; tension springs are also arranged to give the required pressure to the pressure roll when tension is required during stock taking or when blocking the goods; a register to automatically count the number of yards measured off is attached to the machine and preferably operated by the measuring roll the whole device being constructed and operated as hereinafter more fully set forth in the specification and more particularly pointed out in the claim.

Figure 2:
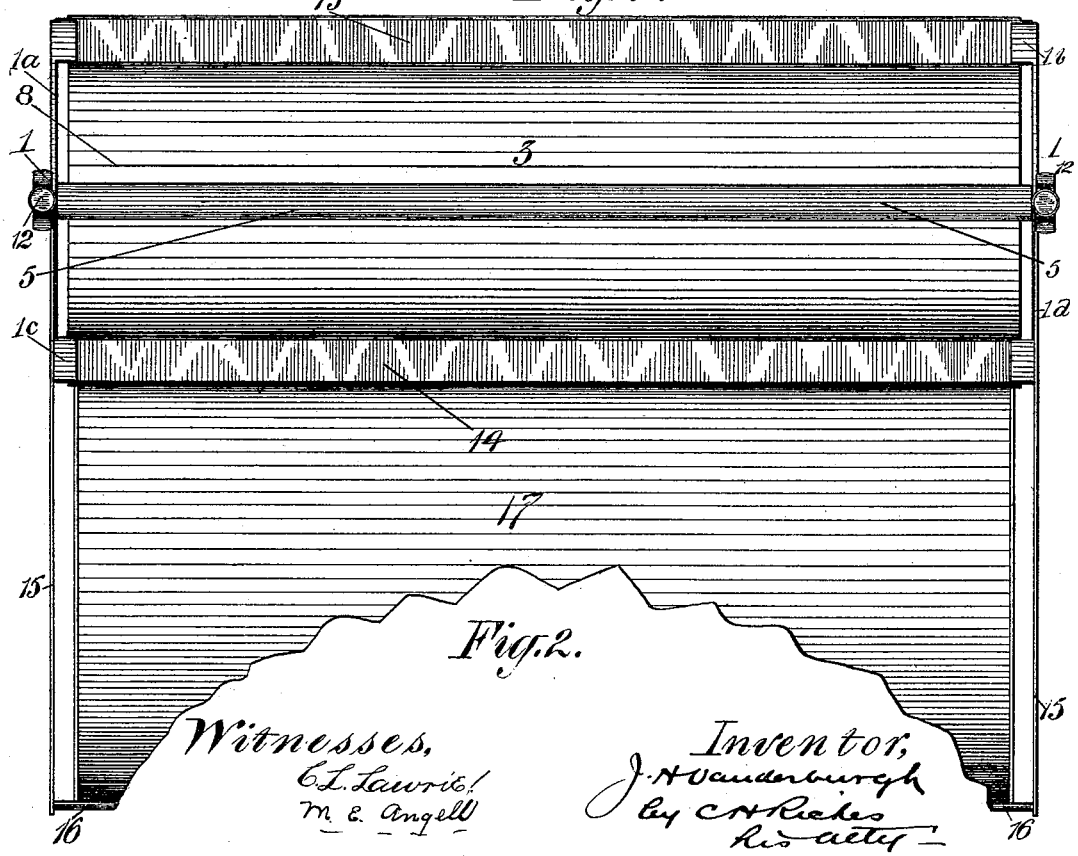

In the drawings:—Figure 1 is a longitudinal sectional view of the device showing the arrangement of the various parts. Fig. 2 is a top plan view of the device. Fig. 3 is an end elevation. Fig. 4 is a perspective view of the inner side of one of the side frames. Fig. 5 is a detail perspective view showing the manner of detachably securing the supplemental frame to the framework of the machine.

Like numerals of reference refer to like parts throughout the specification and drawings.

The invention consists essentially of two side frames, 1, of any suitable shape or size or material. Journaled in the side frames 1 are the spindles 2 of the measuring roll 3. This measuring roll 3 is of a cylindrical form and constructed of any suitable material. The measuring roll 3 is covered preferably with felt or a like material which will readily adhere to the goods $17^a$ during their passage over the said roll. The circumference of the measuring roll 3 measures exactly thirty six inches so that one revolution of the measuring roll 3 will represent one yard of material measured off. Journaled in the side frames 1 are the spindles 4 of the pressure roll 5.

The pressure roll 5 is located preferably above the measuring roll 3, and is covered with a material similar to the material covering the measuring roll 3. The object of covering the measuring roll 3 and pressure roll 5 with felt or like material is to enable the goods while passing between the pressure roll 5 and measuring roll 3 to give motion to the measuring roll 3 in order that it will revolve and accurately measure the goods during its revolutions.

It has been found by experiment that the adherence of the goods to the felt covering of the measuring roll is sufficient to cause the revolution of the roll and also to prevent it revolving faster than the passage of the goods or to come to a stand-still during the passage of the goods without sufficient force being applied to it to tear the goods. Securely fastened to one of the spindles 2 of the measuring roll 3 is a ratchet tooth 6 which engages with a dog 7 secured to the inner side of the frame 1 adjacent to the said spindle and ratchet tooth. The said dog and ratchet tooth are so arranged as to permit of the forward revolution of the measuring roll 3 and are also so arranged as to stop the reverse revolution. The object of this construction is to enable the measuring roll to commence its revolution always from the same starting point and also to prevent the reverse revolution of the measuring roll which would interfere with the number of yards indicated by the register.

On the top of the measuring roll 3 is a line 8 which serves as an indicator to place the edge of the material upon and also to mark where the measuring roll will first commence its revolution. It might here be stated that the measuring roll and pressure roll are both of the same length and slightly longer than the single width of material.

The spindles 4 of the pressure roll 5 are preferably mounted in boxes 9 which slide in suitable guides 10 formed in the side frames 1. Bearing upon each of the boxes 9 is a spring 11 the pressure of which is regulated by a set screw 12. The object of the boxes 9, spring 11, and set screw 12 is to regulate the pressure of the pressure roll 5 upon the measuring roll 3 so that when stock taking or when otherwise required sufficient tension can be provided to properly block the goods.

Forming part of the frame of the machine are a series of four arms $1^a$, $1^b$, $1^c$, and $1^d$, respectively. The arms $1^a$ and $1^b$ are secured one to either of the side frames 1 and project toward the front of the machine and are located above the top of the measuring roll 3. Secured to the outer end of the arms $1^a$ and $1^b$ is a tension bar 13 which serves to regulate the tension of the material passing through the machine and also in practice assists in straightening out the goods after passing through the machine and removing any creases from the said goods and it also enables the goods to be readily handled by the salesmen. The arms $1^c$ and $1^d$ project through the rear of the machine and are similar in all respects to the arms $1^a$ and $1^b$. Secured to the outer ends of the arms $1^c$ and $1^d$ is a tension bar 14 which straightens out the goods before, and prevents them creasing while passing between the measuring roll 3 and pressure roll 5. The tension bar 14 also prevents the web from being drawn up by the goods to the top of the measuring roll. This bar 14 also is used for varying the tension of the goods passing between the measuring roll and pressure roll while taking stock.

When double width goods are being measured or blocked I find it necessary to provide means for keeping the web as far away from the measuring roll 3 as possible as in blocking or measuring double width goods in stock taking it is necessary to reverse the web before allowing the goods to pass into the machine and by this reversion of the web the tendency of the goods is to draw the web up and onto the measuring roll 3. To overcome this difficulty I find it advisable to attach to the machine a supplemental frame consisting of two side bars 15 extending rearwardly from the side frames 1 and detachably secured thereto.

The side bars 15 project a sufficient distance to the rear of the measuring roll 3 so that the web will be kept clear therefrom. Connecting together the ends of the side bars 15 is a bar 16 which throws the web back into the pan 17 when the said web is drawn up from the said pan by the passage of the goods into the machine. The pan 17 is connected to the lower part of the frame 1 and to the rear and below the measuring roll 3. This pan is deeper at its rear end than at its front and is designed especially for the purpose of receiving and retaining the web while the goods are passing through the machine.

The number of revolutions of the measuring roll 3 is kept count of by a register 18 located on the outer side of the machine and as any style of register will answer my purpose I do not confine myself to any particular construction. The number of yards measured is also kept count of by the sound caused by the clicking of the ratchet tooth 6 on the dog 7.

Having thus fully described my invention, what I claim as new, and desire to secure by Letters Patent, is—

In a cloth measuring machine, the combination, of the frames, 1, a measuring roll, 3, journaled in said frames, said measuring roll being provided upon its surface with a line, 8, for indicating the beginning of its rotation, a ratchet tooth, 6, mounted on one end of the spindle of the measuring roll, a dog, 7, mounted on the inner face of one of the frames and adjacent the tooth 6, said tooth adapted to engage with said dog and prevent a reverse rotation of the measuring roll, a pointer connected to and rotating with the measuring roll for indicating the rotation or partial rotation thereof, a pressure roll, 5, mounted above and contiguous to the measuring roll, said pressure roll journaled in boxes, 9, said boxes working in guides, 10, a coil spring, 11, mounted upon the boxes 9, a set screw, 12, mounted in the top of the frames 1 and adapted to regulate the tension of the spring 11, a covering of adhesive fabric material for the pressure and measuring rolls, arms secured to the frames on either side and above the measuring roll and extending to the front and rear thereof, tension bars, 13 and 14, connecting the ends of said arms, a supplemental frame comprising bars, 15, said bars being connected at their rear ends by a cross bar, 16, said supplemental frame extending to the rear of the machine and being detachably secured thereto, and a pan for holding the material to be measured; substantially as and for the purpose set forth.

Orono, October 22, 1892.

J. H. VANDERBURGH.

In presence of—
T. H. BENSON,
ROBERT MOMENT.